358-74 SR
F3375 OR 3,735,029

United States Patent [19]
Sunstein

[11] 3,735,029
[45] May 22, 1973

SUBSTITUTE FOR MISSING COPY

[54] METHOD AND APPARATUS FOR MAINTAINING THE BEAM CURRENT OF AN IMAGE-DISPLAY DEVICE WITHIN CONTROLLED LIMITS

[76] Inventor: David E. Sunstein, 464 Conshohocken State Road, Bala-Cynwyd, Pa. 19004

[22] Filed: Apr. 9, 1971

[21] Appl. No.: 132,692

[52] U.S. Cl...........178/5.4 R, 178/7.5 DC, 178/7.5 R
[51] Int. Cl..............................H04n 5/58, H04n 9/16
[58] Field of Search.......................178/5.4 R, 7.3 DC, 178/7.5 DC, 7.3 R, 7.5 R, DIG. 11

[56] References Cited

UNITED STATES PATENTS

| | | | |
|---|---|---|---|
| 3,541,240 | 11/1970 | Curtis | 178/5.4 R |
| 3,465,095 | 9/1969 | Hansen et al. | 178/5.4 R |
| 3,612,756 | 10/1971 | Akatsu et al. | 178/7.5 DC |
| 3,564,137 | 2/1971 | MacIntyre, Jr. et al. | 178/7.5 DC |
| 3,009,989 | 11/1961 | Ahrons et al. | 178/5.4 R |
| 3,072,741 | 1/1963 | Ahrons et al. | 178/5.4 R |
| 3,578,903 | 5/1971 | Willis | 178/5.4 R |
| 3,179,743 | 4/1965 | Ahrons et al. | 178/5.4 R |

*Primary Examiner*—Robert L. Richardson
*Attorney*—Howson & Howson

[57] ABSTRACT

Harmful defocusing of the cathode-ray beam in the picture tube of a color television receiver caused by the effects of excessive beam current is prevented by sensing the effects of high average beam current and producing a control signal which is applied so as to oppose and prevent excessive average beam current, while also providing for maintenance of a minimum value of beam current. Preferably, a control signal is created by sensing whether the anode high-voltage supply for the cathode-ray tube is operating safely within its useful voltage regulating range, and the control signal is applied to a feedback loop to reduce the gain or the DC level of the intensity control signal applied to the cathode-ray tube, in a manner to limit the maximum average brightness and/or contrast of the produced color television image to keep within the regulator range of the anode supply, despite changes in received picture content and in the settings of the operator's brightness and/or contrast controls.

25 Claims, 5 Drawing Figures

INVENTOR.
DAVID E. SUNSTEIN
BY
Howson & Howson
ATTYS.

INVENTOR
DAVID E. SUNSTEIN
BY
Howson & Howson
ATTYS.

INVENTOR:
DAVID E. SUNSTEIN

BY
Howson & Howson
ATTYS.

METHOD AND APPARATUS FOR MAINTAINING THE BEAM CURRENT OF AN IMAGE-DISPLAY DEVICE WITHIN CONTROLLED LIMITS

BACKGROUND OF THE INVENTION

This invention relates to method and apparatus for automatically controlling a brightness-determining electrical parameter acting within an electrical image-display device. More particularly, the invention relates to method and apparatus for preventing harmful effects which may otherwise be produced by excessive average cathode-ray current in a cathode-ray tube (CRT), and especially to such method and apparatus for automatically controlling the intensity of the cathode-ray beam so as to avoid or reduce harmful defocusing due to excessive average beam current. In a more specific aspect, it relates to method and apparatus for reducing or eliminating harmful cathode-ray beam defocusing in a color television receiver when the combination of the settings of the operator's controls on the receiver and the picture information prescribed by the received signal are such that harmful defocusing might otherwise occur.

There are a variety of applications in which cathode-ray tubes are utilized in which it is important to maintain a predetermined minimum degree of focusing of the beam. In certain types of such systems, there is a tendency for the beam to become substantially defocused as the beam current increases beyond a predetermined level. This effect may occur to a certain extent at instantaneous high beam intensities merely due to the electron optical design of CRT gun, or to the electrostatic repulsion of the electrons in the beam. In many cases, particularly where non-zero voltage electrostatic focus is used, or where magnetic focusing of the beam is used, such defocusing may occur because the final anode voltage of the tube, even though well regulated for some beam currents, is not sufficiently well regulated for the high values of beam current, and tends to drop substantially when the average beam current becomes excessive. Since the focus of the beam is in part dependent upon the magnitude of the final anode voltage, such decreases in anode voltage, if of sufficient magnitude, may cause a degree of defocusing which is objectionable or even debilitating.

For example, in one application with respect to which the invention will be described in particular detail herein, the color image reproduction cathode-ray tube of a color television receiver of the beam-indexing type is supplied with color television signals of the usual general type and is provided with final anode voltage from a conventional high-voltage supply having regulating means associated therewith which is not perfect in its action over all ranges of average beam current, but instead permits a substantial decrease in anode voltage to occur if the average beam current has a sufficiently-high value. If this occurs, the beam may become sufficiently defocused to prevent proper image display. More particularly, in the case of the beam-indexing type of color television system the defocusing may become sufficiently great to reduce the color saturation of displayed primary colors, by the beam illuminating more than one color stripe at a time; or if the beam be even further defocused, the indexing elements in the tube may no longer be well resolved by the beam and the indexing signal processing circuit may fail altogether to give useful index information during certain periods of time.

For example, in a beam index type of color television receiver such as is disclosed and claimed in my U.S. Pat. Nos. 2,892,123 3,013,133, and 3,305,788, there will normally be included and operator's brightness control for enabling control of the general brightness of the television picture, and an operator's contrast control for controlling the contrast of the picture. Depending upon the operator's preferences and idiosyncrasies and upon the nature of the television signal at the time, these two controls may be set by the operator to produce any of a large variety of different conditions. For example, the operator may set the brightness and contrast controls to produce what he considers a pleasing picture at a time when the picture information being received represents a picture of average, or below average, general brightness and/or contrast; in this case, the controls will be set at relatively high brightness and contrast positions. However, when thereafter the television signal changes to represent a scene of greater average brightness and/or contrast, the average cathode-ray beam current may increase to such an extent that the final anode voltage of the cathode-ray tube falls substantially, producing a defocusing of the beam due to loss of regulation in the high-voltage supply. If the change in high voltage be great enough, the beam no longer adequately resolves the index stripes in the cathode-ray tube, preventing proper operation of the index signal circuits and thereby preventing proper color rendition. These conditions will persist until the operator resets the controls, or until the received signals change so as to represent a scene brightness and contrast closely compatible with those existing when the controls were originally set by the operator.

On the other hand, if the contrast control and brightness control are originally set by the operator during the reception of very bright television scenes to settings consistent with the beam then not defocussing excessively, then when scenes are received which are less bright, or have less contrast, the reproduced image will have less brightness and contrast than the operator prefers, necessitating a resetting of the controls to obtain then the optimally pleasing picture.

In addition, it is also clearly preferable from the viewpoint of customer acceptance to have contrast and brightness controls which cannot be adjusted, or misadjusted, by the operator to cause excessive defocusing or consequent loss of index or proper color rendition.

Related to this problem is the requirement in the above cited index type of tube of providing at least a minimum beam intensity at substantially all times during the scanning of the indexing lines, so that indexing will not fail even during scanning of portions of the image which are intended to appear black. One way of assuring this is to provide a rectifier limiter or clipping circuit which in effect prevents the grid-to-cathode voltage of the cathode-ray tube from ever going more negative than a value which will produce the minimum beam intensity required to maintain indexing. The system utilized in accordance with the invention to prevent the above-described excessive beam defocusing preferably also operates in a manner which is compatible with maintaining a certain minimum beam current at all times for indexing purposes.

There are other types of color television image-presentation tubes, such as the "shadow-mask" or aperture grid tube for example, in which maintenance of fixed high voltage is also important for proper color rendition, and in which unpleasant defocusing and color desaturation and beam tracking missregistry may occur due to decreases in high voltage when the average beam current exceeds the range of values over which the high voltage supply can regulate.

The above cited problems all result from lack of regulation of the high voltage supply for some values of beam current. Any attempt to solve this problem by limitation of peak cathode ray tube beam current (as by a video limiter) will cause the further problem that it will reduce maximum available highlights, and cause a loss of detail in highlights where the limiter is operating. Any attempt to solve the problem by increasing the current output capabilities of the high voltage supply will prove costly, and undesirable from the standpoints of size, weight, and heat dissipation.

Accordingly, it is an object of the invention to provide a new and useful method and apparatus for maintaining the operation of an image-display device within controlled limits.

A further object is to keep the average current of the beam of a cathode-ray tube below a predetermined maximum value, without limiting the peak intensity of the beam current.

Another object is to provide method and apparatus for reducing or eliminating excessive defocusing of the beam of a cathode-ray tube.

A further object is to provide method and apparatus for automatically controlling the signals applied to a color television image-display cathode-ray tube to prevent excessive defocusing of the beam therein under certain conditions of its operation.

Another object is to provide new method and apparatus for automatic control of the brightness and/or contrast of a television image display in a manner which will prevent excessive changes in high voltage and/or excessive defocusing of the beam.

Another object is to allow full control of average display brightness by transmitted picture instructions, for all values of average brightness below some maximum value; and to limit the maximum average displayed brightness below that dictated by the transmitter whenever such transmitted instructions would otherwise cause deleterious picture quality due to requiring more average beam current than can readily be supplied.

Another object is to reduce the need for operator adjustments of a color television receiver upon changes of scene brightness.

It is also an object to provide new method and apparatus for overcoming or mitigating the effects of incomplete regulation of the high-voltage anode supply for a color television image display tube, produced in response to increases of the average current in the cathode-ray beam above a predetermined level.

It is also an object of the invention ti allow a less costly high voltage supply and regulator system than otherwise, particularly for color TV receivers, by automatically modifying the signals fed to the cathode-ray tube so as to reduce large average current demands which could otherwise be placed on such power supply by changes of picture content or by operator control settings.

It is also an object to provide such method and apparatus including means for assuring maintenance of at least a predetermined minimum intensity of cathode-ray beam sufficient to maintain adequate indexing signals from a beam-indexing type of cathode-ray tube.

SUMMARY OF THE INVENTION

In accordance with the invention, these and other objects are achieved through the provision of apparatus responsive to effects caused by changes in a brightness-determining electrical parameter acting within an image-display device to limit the average value of said electrical parameter to a predetermined maximum value. In applications of the invention to a cathode-ray tube type of image-display device, there is employed means responsive to effects caused by changes in the average beam-current of a cathode-ray tube to produce an electrical control signal indicative of the occurrence of increases in the average value of said beam current above a predetermined level, and means for applying said control signal to modify the voltages applied to the beam-intensity controlling electrode of said tube in the direction to oppose said increases in average value of said beam current.

In one preferred embodiment, the means for producing the control signal comprises a circuit for sensing the current through a shunt regulator for the anode high voltage supply of a cathode-ray tube, decreases in the regulator current below a predetermined minimum value serving to indicate that a high average beam current has caused the demands upon anode high voltage to be great enough that any further demands would cause defocusing or other harmful effects. In another preferred form, the occurrence of excessive average beam current is sensed by an averaging circuit in the current supply circuit for the cathode of the cathode-ray tube, and in another preferred form the average of the horizontal flyback pulse voltage is sensed and used for this purpose.

Preferably also, in a color television receiving system the control signal is fed back to the television signal channel through which brightness-controlling signals are supplied to the grid of the cathode-ray tube, in such a way as to vary automatically the contrast and/or background brightness of the image in the direction to avoid excessive current demands on the high voltage supply and consequent defocusing of the beam. This is done by using the control voltage to vary the signal gain or the effective DC level of the television signal. With such an arrangement, regardless of the content of the received television signals, if the operator attempts to adjust the contrast and/or brightness controls to such a high contrast or brightness condition that excessive beam-defocusing might occur, the above-described feedback system, in effect, makes these controls ineffective beyond a certain point, and the operator therefore cannot adjust the controls in a manner which will produce the excessive defocusing and loss of index described above.

BRIEF DESCRIPTION OF FIGURES

These and other objects and features of the invention will be more readily understood from a detailed consideration of the following description, taken together with the accompanying drawings in which.

DETAILED DESCRIPTION OF SPECIFIC EMBODIMENTS

Figure 1:
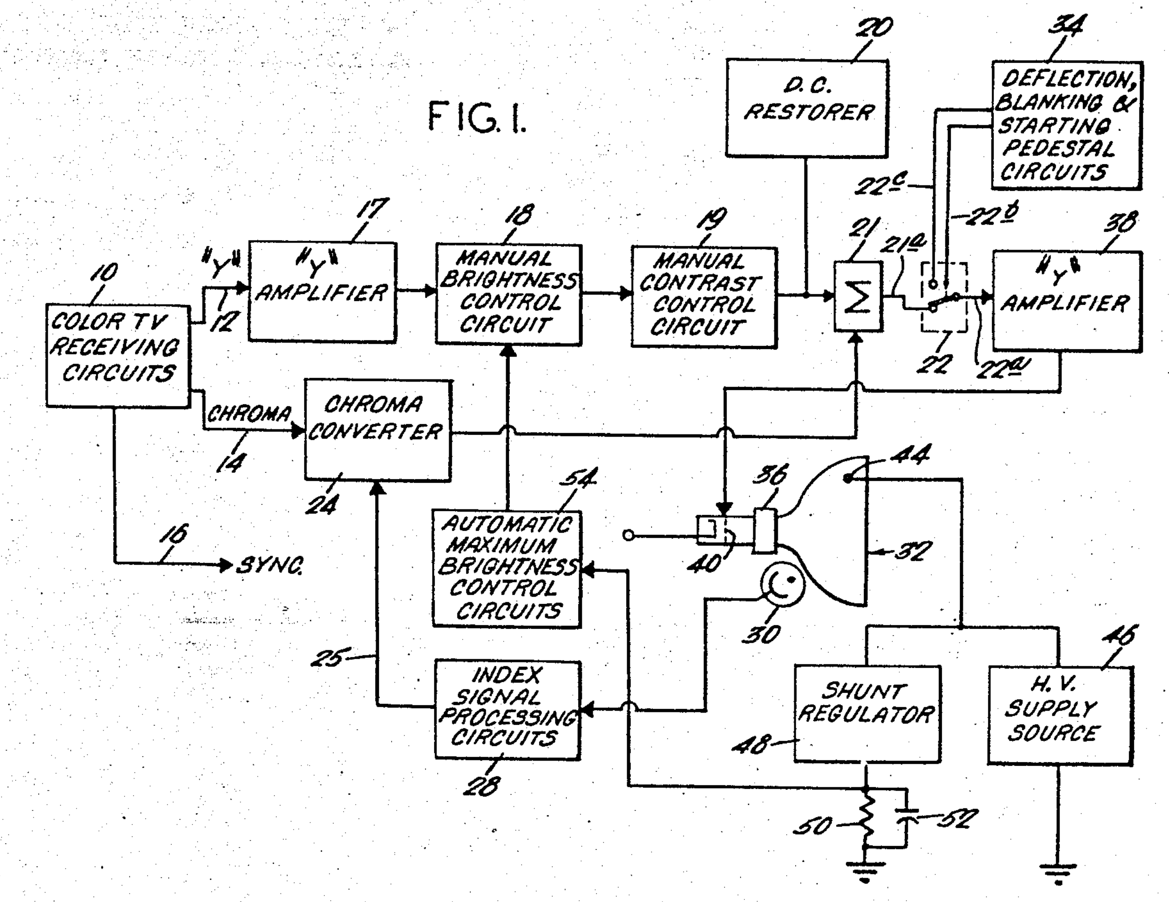
FIG. 1 is a diagram, principally in block form, illustrating one general arrangement in accordance with the invention in one of its forms.

Referring now by way of example only to the particular embodiments of the invention shown in the drawings, FIG. 1 shows in a generalized manner, and with some of the conventional elements omitted in the interest of simplicity, a television receiver and image display system of the beam-indexing type utilizing the invention in one of its forms. Color television receiving circuits 10 may be generally conventional in form so as to produce on output lead 12 a signal designated as the Y signal, or luminance signal; on output lead 14, a chroma signal; and on output lead 16 various synchronizing pulse outputs utilized to control timing in the system. As is well known, the Y signal represents primarily the brightness of the televised scene and the chroma signal represents primarily the hue and saturation of the televised scene.

The Y signal is passed through a Y amplifier 17, a manual brightness control circuit 18, a manual contrast control circuit 19, and a DC restorer 20, to a first adding circuit 21. These elements may each be generally of conventional form, although in black-and-white TV receivers or shadow-mask color receivers the brightness control more typically follows, or is coincident with, the DC restorer; in the indexing type of receivers of the type here described in detail, it can precede the DC restorer, as shown herewith. The manual brightness control circuit 18 is adjustable by the operator in effect to vary the DC component of the signal, and the contrast control circuit 19 is adjustable by the operator to vary the gain accorded the signal.

The chroma signal on lead 14 is passed through a chroma converter 24 and thence to the adder 21 in modified form, as determined by signals supplied to the chroma converter 24 over lead 25 from index signal processing circuits 28. The index signal processing circuits 28 may be generally like those described and claimed in my above-cited U.S. Letters Patents, and are supplied with starting unambiguous index signals and also running ambiguous index signals from photosensitive device 30, which views appropriate indexing stripes positioned on the inside of the front face of the cathode-ray color-image display tube 32 ("picture tube") by way of an appropriate window in the wall of the tube, as also set forth fully in my above-cited patents.

The combined Y and chroma signals from first adder 21 are supplied over line 21*a* to a starting switch 22, which passes the signals on line 21*a* to line 22*a* during the viewable part of each TV line. When the beam is not scanning the viewable area of the picture, the starter switch 22 feeds to line 22*a* appropriate blanking and starting pedestal signals on line 22c from the deflection, blanking and starting pedestal circuits 34, which also controls by line 22*b* the switching of starting switch 22. The circuits 34 not only provide appropriate deflection signals for application to the magnetic deflection yoke 36, but also produce appropriate horizontal and vertical blanking signals and also provide by line 22*c* a fixed voltage pulse which occurs at the beginning of each horizontal sweep so as to maintain the beam intensity at a suitable level for assuring the production of proper indexing signals from the index starting stripes positioned adjacent the beginning of each horizontal line scan.

The combined signal from starting switch 22 is passed by line 22*a* through Y amplifier 38 by appropriate direct-current connections, and supplied thence to the beam-intensity controlling grid 40 of the cathode-ray tube 32.

The final anode connection 44 of the cathode-ray tube 32 is supplied with appropriate high voltage from a conventional voltage supply, comprising high-voltage supply source 46, and shunt regulator 48 connected in parallel therewith and in series with an RC circuit made up of a resistance 50 in parallel with a capacitor 52. Shunt regulator 48 may comprise any of a variety of well-known conventional devices, such as the well-known corona-discharge regulator or such as a shunt triode regulator with appropriate grid drive circuits. The shunt regulator has the usual property of exhibiting a very steep current-versus-voltage characteristic for voltages in the vicinity of the desired high voltage for anode 44, and a very much less steep current-versus-voltage characteristic for somewhat lower values of the high voltage and draws little, if any current, for voltages below the nominal regulating voltage range. As is normally the case, if the cathode-ray tube 32 is drawing no current from the high-voltage supply, the current through the shunt regulator 48 will be at its highest value. As the cathode-ray beam current increases, the current through the shunt regulator decreases, but because of the regulator characteristic described above, the voltage across the regulator, and hence the voltage at anode 44, does not decrease markedly. However, when the picture tube beam current rises above a predetermined level, the current through the regulator will decrease to a point such that the regulator begins to operate below the steep portion of its characteristic where it is most effective as a regulator, and the high voltage will begin to fall somewhat. With any further increase of picture tube current there will be a still further reduction in regulator current, and substantial reduction of high voltage: the supply is then said to be out of regulation, and the associated substantial decrease in anode voltage will produce substantial defocusing of the beam or other deleterious effects.

In accordance with the invention, the current-sensing resistor 50 is employed for developing across it a voltage which decreases as the cathode-ray beam current increases (and in fact decreases quite rapidly when the beam current increases above a predetermined value for which harmful defocusing of the beam may occur), together with the automatic maximum brightness control circuits 54 to which the voltage developed across 50 is applied, the automatic maximum brightness control circuits 54 being connected to the manual brightness control circuit in a manner such that reductions in the voltage across resistor 50 tend to reduce the general brightness of the television image. Preferably the value of the resistor 50, the gain in the automatic maximum brightness control circuits 54, and the regulating characteristic of the regulator 48 are such that any tendency of the average cathode-ray tube beam current to increase above a predetermined desired maximum level is almost completely counteracted by an automatic decrease of the DC level of the signal applied to the cathode-ray tube beam-current controlling grid 40.

Accordingly, if because of any combination of color television signal being received and adjustment of the manual brightness control circuit or the manual contrast control circuit, the average intensity of the cathode-ray beam should tend to rise above a predetermined maximum desired level, it is prevented from so doing by the action of the automatic maximum brightness control circuits 54. If the operator attempts to increase the average beam current above this maximum level by operation of the manual brightness control circuit 16 or the contrast control 18, he will find that his attempts at further adjustment in this direction will be automatically compensated. In this way the average cathode-ray beam intensity is maintained within a range of values for which excessive beam defocusing does not occur, with the result that there does not occur degradation of focus; and therefore satisfactory indexing and satisfactory color rendition in the reproduced image are maintained.

As will be described more fully hereinafter, the automatic maximum brightness control circuits need not be connected to the manual brightness control circuit, but may be connected elsewhere along the signal channel to vary the DC component of the television signal applied to the CRT grid. Furthermore, the control signal from the automatic brightness control circuits may instead be applied in such manner as to vary the gain accorded the received television signal, as by using the control signals to vary the gain of a variable-gain stage through which the signal passes on its way to the cathode-ray tube grid.

Figure 2:
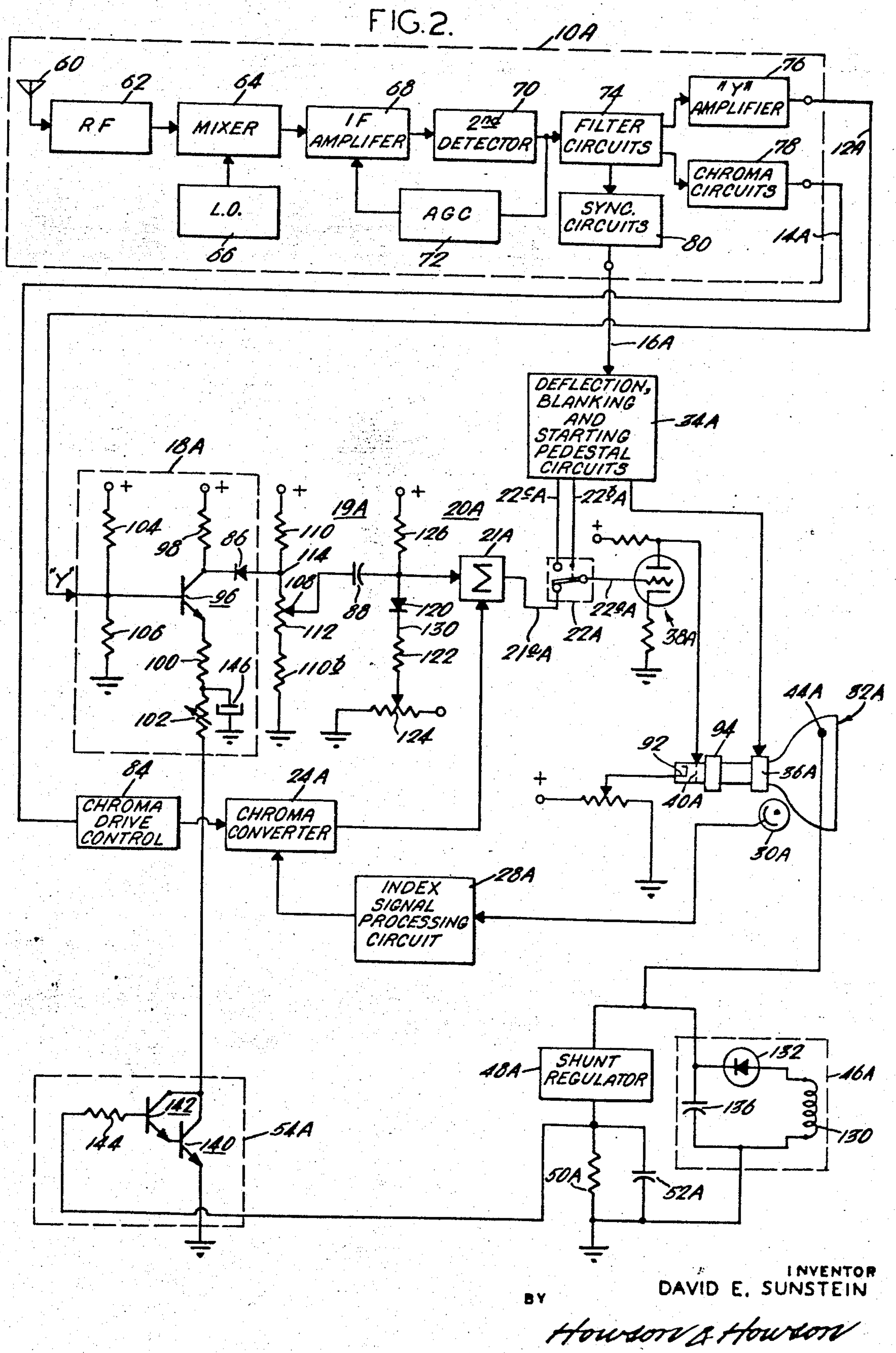
FIG. 2 is a diagram, partly in block form and partly in electrical schematic form, illustrating in more detail one preferred embodiment of the invention.

Referring now more specifically to FIG. 2, in which certain corresponding parts are indicated by the same numerals as in FIG. 1 but with the suffix A, the color TV receiving circuits 10A in this example comprise the receiving antenna 60, an appropriate RF amplifying section 62, the usual mixer 64 and local oscillator 66, IF amplifier 68, second detector 70, and AGC circuit 72, the output of the second detector being passed through appropriate filter circuits 74 to separate the Y signal for application to the Y amplifier 76 and to separate the chroma signal for application to the chroma circuits 78. Signals from filter circuits 74 are also applied to synchronizing circuits 80, which derive the usual horizontal and vertical synchronizing pulses. The corresponding Y, chroma and sync output leads are designated as 12A, 14A, and 16A, respectively.

The chroma signals are preferably supplied to a chroma drive control 84, which may be an ordinary potentiometer arrangement, permitting manual adjustment of the amplitude of the chroma signal and hence of the saturation of the final color image. The chroma signal is then supplied through chroma converter 24A to the adder 21A, as previously described.

The Y signal is passed through the manual brightness control circuit 18A (including the manual brightness control 102 and the minimum brightness rectifier 86), the manual contrast control circuit 19A, capacitive means 88, and DC restorer 20A, to the adder 21A. The combined Y signal and the converted chroma signal from adder 21A are supplied to the starting switch 22A, through which they pass during the viewable part of each scan line when switch 22A is set to pass signals on line 21*a*A to line 22*a*A. When the beam is not on the viewable area, the switch is set by a pulse on line 22*b*A to cause line 22*a*A to be fed only by line 22*c*A with appropriate blanking and starting pedestal pulses from circuits 34A. Thus, the synchronizing pulse output of sync circuits 80 is applied to the deflection, blanking and starting pedestal circuits 34A, which generate and apply to starting switch 22A the appropriate horizontal and vertical blanking impulses, as well as a starting reference pulse occurring at the beginning of each horizontal sweep to maintain the beam intensity at a predetermined level so as to assure adequate operation of the starting index stripes positioned adjacent the starting margin of each horizontal line. Circuits 34A also apply suitable horizontal and vertical deflection signals to the CRT deflection yoke 36A. The composite output from the starting switch 22A is applied through the Y amplifier 38A to the intensity-controlling grid 40A of the color television picture tube 32A.

In this example, the picture tube 32A is assumed to have its cathode 92 biased positive to ground and somewhat positive with respect to the grid 40A, and to have the usual focusing means, such as magnetic focusing coil 94, disposed around its neck and provided with suitable focusing current.

The high-voltage anode connection 44A for the tube is supplied with final anode voltage from high-voltage supply source 46A, and the shunt regulator 48A is connected in series with the parallel combination of current-sensing resistor 50A and bypass capacitor 52A.

The photosensitive device 30A responds to impingement of the cathode-ray beam upon the starting stripes and upon the running indexing stripes in the cathode-ray tube, and develops corresponding "raw" indexing signals for application to the index-signal processing circuit 28A. The unambiguous "clean" index signal from the latter circuit is then supplied to the chroma converter 24A for combination with the received chroma signal.

Considering now the circuit of the preferred embodiment in more detail, the manual brightness control circuit 18A comprises an NPN transistor 96 connected in the common-emitter configuration, with its collector load resistor 98 connected to the usual low-voltage positive supply (designated "+"). The emitter circuit thereof includes a fixed resistor 100 in series with a manually variable brightness-control resistor 102 and with the automatic maximum brightness control circuits 54A. The base of transistor 96 is biased positively by connection to the tap on a resistive divider made up of resistors 104 and 106, connected between ground and the positive supply, and this bias also serves as the collector bias for the transistor output amplifier stage of Y amplifier 76 which feeds the base of transistor 96. The Y signal applied to the base of transistor 96 is such that the tips of the sync pulses are directed downwardly and, due to the inverting property of transistor stage 96, the signal at the collector of the transistor is poled so that the sync tips are directed upwardly or positively.

If the lower end of the brightness control resistor 102 were connected directly to ground, rather than through the automatic maximum brightness control circuit 54A, the self-biasing action of the transistor would produce at the upper terminal of brightness control resistor 102 an emitter bias voltage which would be increased by increasing the resistance of control resistor 102 and decreased by decreasing it. This in turn would be reflected in a corresponding controlled variation of the emitter-to-base bias of the transistor and in a corresponding change in its quiescent operating current point. That is, when control 102 is operated to increase its resistance, there is less current through the transistor and the direct voltage at the collector thereof becomes more positive.

The contrast control 19A consists of a variable tap 108 on the voltage divider made up of series-connected resistors 110, 110*b*, and 112, the lower the position of the tap the less the gain and therefore the less the contrast of the reproduced image.

Rectifier 86, which limits how small a beam current can be created by the Y signal, has its cathode connected to the collector of transistor 96 and its anode connected to the tap point 114 between the divider resistors 110 and 112. Accordingly, when the collector voltage of transistor 96 becomes more positive than the voltage at tap 114 the rectifier 86 does not conduct, and the maximum collector voltage which can pass through the rectifier 86 is that for which the rectifier ceases conducting, high voltages effectively being clipped by the rectifier. Voltages less positive than this clipping level are passed through the rectifier 86. The static voltage at tap point 114, as determined by the relative values of resistors 110 and 112, and 110B, therefore determines the most positive signal voltage which will be passed further through the signal channel, i.e., it determines the clipping voltage level for "black" signals, so that signals blacker than some level (determined by bias on diode 86) cannot pass through to junction 114.

The DC restorer 20A consists of a rectifier 120 having its anode connected to capacitor 88 and its cathode connected through resistor 122 to a variable tap on the biasing resistor 124, which in turn is connected between the positive supply and ground potential. The anode of rectifier 120 is also connected through a resistor 126 to the positive supply voltage. The DC restorer operates in known manner to adjust the DC component of the television signal so that the most positive portion thereof is clamped at the voltage established at connection point 130 in the absence of signal. By adjustment of the tap on resistor 124, this value of clamping voltage can be adjusted as desired. Ordinarily this adjustment will not be a customer or operator adjustment, although it may be one of the adjustments made available at the rear of the television receiver for convenience in adjustment when needed. It would normally be set so that the minimum picture tube beam current on the blackest part of a black picture, is none-the-less sufficient to insure adequate index signal, to allow for the index processing circuits 28A to properly operate; yet so that the minimum beam current does not cause objectionable light output to the viewer.

Before proceeding with a detailed description of the inventive portion of the system herein claimed, there will first be described a preferred adjustment and operation of the Y signal channel on the assumption that the lower end of the manual brightness-controlling variable resistor 102 is connected to ground, rather than through the automatic maximum brightness control circuit 54A.

In order to assure that there will always be adequate indexing signal picked up from the cathode-ray tube starting index stripes and running index stripes, a predetermined minimum intensity of the cathode-ray tube beam should be maintained at all times during the normal forward scanning of the regions containing these stripes. This is preferably accomplished by initially adjusting the tap on the resistor 124 in the DC restorer so that the value of clamping voltage produced at connection 130 thereof produces at the grid of the cathode-ray tube exactly that voltage required to maintain the desired minimum beam intensity. It will be understood that the direct-coupled Y amplifier 38A inverts the signal present at the DC restorer, so that the clamping voltage determines the most negative voltage applied to the grid of the cathode-ray tube; all other voltages applied to the CRT are therefore more positive and hence produce higher intensities of beam current, whenever the starting switch 22A is in its running position connecting line 21*a*A to line 22aA. Accordingly, no matter what type of signal is applied to the DC restorer circuit, the desired minimum beam intensity will be preserved at all times during the scanning of the index-stripes.

Having thus determined and set the minimum beam intensity, or image background brightness, it remains to consider the effect of the rectifier 86 on the picture rendition. In an ordinary black-and-white television system in which the rectifier 86 is not employed, the DC restorer normally levels on the sync tips and the voltage difference between the sync tips and the black level of the received signal remains substantially constant. However, in the presently proposed system the rectifier 86 clips the received signal at differing levels thereof, depending upon the setting of the brightness control 102. More particularly, increasing the value of the resistance of brightness control resistor 102 reduces the current through transistor 96 and causes the quiescent collector voltage thereof to become more positive. This means that it will then require a lesser value of negative going signal at the base of transistor 96 to cut off the diode 86, and clipping by diode 86 will then occur further toward the white end of the received signal, causing a reduced peak-to-peak excursion of voltage at junction 114. Since the DC restorer then clamps on the "blackest" signal voltage at junction 114 (which is the clipping level of diode 86) the signal reaching the cathode-ray tube grid is maintained at a fixed "blackest" level; so with the reduced peak-to-peak excursions at point 114 caused by the increase of resistance of control 102, the average brightness of the reproduced image is thereby reduced. Reducing the value of brightness control resistor 102 has an opposite effect, causing the average brightness to increase.

Preferably, the Y signal presented on line 12A is direct coupled out of the 2nd detector 70. If it is not, then variations in the average brightness of the horizontal line caused by the received signals also produce changes in the level at which the clipping occurs. If the input signal to the brightness controlling transistor 96 has not been leveled or DC-restored, it will have no DC omponent, and the brighter the line being represented the more positive will be the sync-pulse extremes of the signal at the collector of transistor 96. This results in a tendency for the clipping level to move somewhat in a direction toward the white extreme of the received signal with a bright scene, and since the DC restorer levels on the most positive extreme of the signal, this reduces somewhat the brightness of the reproduced image which would otherwise occur. But even with the above assumed AC coupling there will still be a net increase in average brightness of the reproduced image in response to increases in brightness of the televised scene, particularly due to the non-linear relationship between cathode-ray tube grid bias and beam current.

Accordingly, the average brightness of the reproduced image, and hence the average cathode-ray beam current, increases with increase in brightness of the televised scene and with operator adjustment of the brightness control 102 to smaller resistance values, made in an effort manually to increase the brightness of the scene to suit the operator's preference.

The bias level for rectifier 86 as determined by selection of the resistors 110, 112 and **110*b* may be chosen by comprises which will be apparent to one skilled in the art to produce an acceptable range of brightness control by variation of control 102. One suitable choice is to reverse-bias rectifier 86 so that, when receiving an "all-black" picture signal and with the brightness control 102 turned all the way down (maximum resistance), a clipping occurs at a level extending through the sync pulses just beyond the black level of the received signal. When the average brightness of the television image increases (if AC coupling of the Y signal is used to feed line 12A**) or when the brightness control is turned up, the clipping level will shift to produce higher average brightness, but this is not objectionable since the picture as a whole is then also brighter.

Considering now the high-voltage supply source 46A, in this example it is shown as comprising the secondary 130 of the horizontal deflection output transformer, a high voltage rectifier 132 connected to rectify the voltage applied thereto from the secondary 130, and a high-voltage capacitor 136 connected between the rectifier cathode and ground to provide a voltage smoothing action.

When the combination of the setting of the brightness control 102 and the brightness of the scene being represented by the received transmissions is such that the average cathode-ray current rises above a predetermined level, as explained previously the current through the shunt regulator 48A will soon begin to fall very substantially, toward a condition in which it does not regulate adequately, and the voltage applied to the final anode connection 44A will tend to fall to such an extent that the beam will become appreciably defocused. While in an ordinary black-and-white television system such defocusing would merely degrade slightly the sharpness of the reproduced image, in the case of an indexing tube in which very narrow and closely spaced indexing elements are impinged successively by the scanning cathode-ray beam to produce the indexing signal, such appreciable defocusing may cause the beam to impinge adjacent indexing elements with nearly the same intensity, in which case the strength of the indexing signal will become very small, or in effect, may vanish altogether. As a result, there will not be adequate indexing signal to feed back through the index signal processing circuit 28A to the chroma converter 24A, and hence the chroma signal reaching the cathode-ray tube grid will be without proper relation to the color-reproducing elements on the cathode-ray tube, and faithful color rendition will be lost.

To prevent this in accordance with the invention, the sensing resistor 50A senses the current through the shunt regulator 40A and produces a voltage across this resistor which is relatively more positive when the shunt regulator current is relatively high and the average image brightness within the range for which the focus is acceptable, and which is relatively less positive when the regulator current begins to drop to, or toward, the point at which loss of regulation, drop in high voltage, and loss of sharp focus, will occur. The automatic brightness control circuits 54A are supplied with the voltage thus generated across sensing resistor 50A and, in effect, respond thereto to produce an increasingly large resistance in series with the brightness control resistor 102 when the image tends to become so bright that harmful defocusing is imminent. This increase in resistance has an effect similar to that described previously with reference to increasing the value of the brightness control 102, except that it operates automatically. As explained previously, such an increase in resistance reduces the current through transistor 96, causes the collector voltage of transistor 96 to become more positive, and thereby causes rectifier 86 to clip the television signal farther in the direction toward the signal extreme representing peak brightness. This ability of the automatic control circuit to introduce large values of resistance enables it to swamp out completely any effort by the customer to increase the brightness (decrease the resistance of 102) beyond the level at which substantial defocusing occurs.

Considering then in detail the particular form of automatic brightness control circuit illustrated in FIG. 2, it comprises an NPN transistor 140 having its collector connected to the lower end of the brightness control resistor 102 and its emitter connected to ground, and another NPN transistor 142 having its collector connected to the base of the latter transistor; the voltage from sensing resistor 50A is supplied to the base of transistor 142 by way of a series resistor 144, and a large-valued video-bypass capacitor 146, which may be of the electrolytic type, is connected between the top end of the resistor 102 and ground. When the system is operating and the image brightness is not excessive, a substantial voltage, such as ten volts, is produced across sensing resistor 50A, which is supplied through resistor 144 to the base of transistor 142 to cause it to conduct heavily, and, in turn, to cause transistor 140 to conduct heavily in its saturation condition. Under these conditions, transistor 140 may, for example, exhibit a substantially fixed voltage drop of about one-half volt between its collector and ground. The same low voltage drop will occur so long as the shunt regulator is drawing a current sufficient to saturate transistor 140, and this could represent the case for scenes anywhere from black to quite bright.

However, when the average image brightness, and hence the average cathode-ray beam current, increases still further so as to reduce the shunt regulator current and the voltage across sensing resistor 50A to the level of about one-half volt, indicating that the regulator is almost out of regulation and harmful beam defocusing is imminent, the conductivity of transistors 142 and 140 will decrease sharply, since the drop in the base-to-emitter region of transistor 140 plus that of transistor 142 will be great enough to cause negligible base current to flow for one-half volt on the base of 142. This will then cause the voltage bias at the emitter of transistor 96 to rise sharply in a positive direction, thereby reducing the brightness of the image which would otherwise occur. In this way the maximum average brightness of the reproduced image is automatically limited to a safe value for which harmful defocusing does not occur.

Under the last-described condition in which transistor 140 exhibits a relatively high resistance, transistor 96 not only operates to reduce image brightness by virtue of the change in clipping level by rectifier 86, but there will generally also be, at least to some extent, a concurrent reduction in the gain provided by transistor 96 due to the change in its operating current point. This decrease in gain operates in the same direction as the shift in collector voltage so far as change in the clipping level and reduction of the brightness of the image is concerned, and these two effects are therefore additive.

Adjustment of the contrast control has an effect similar to the effect of the usual contrast control in the Y channel of a color television set or a black-and-white television set, in that it changes the total amplitude of the television signal, compressing the range of reproduction extending from black to full white, or expanding it, depending upon the direction of adjustment of the contrast control.

Without thereby in any way limiting the scope of the invention, the following examples or particular values employed in one specific embodiment are given in the interest of complete definiteness. Using an index type of color television cathode-ray tube 32A in which the color triplet stripes are scanned at a 6mHz rate, the high-voltage supply source 46A is of the circuit form shown in FIG. 2, and the capacitor 136 has a value of about 0.0005 microfarad. The shunt regulator 40A is a type GV4S 2300 corona discharge regulator tube (available from the Victoreen Instrument Division of VLN Corporation, Cleveland, Ohio) normally passing about 1 to 1 ¼ milliamperes of current when the reproduced image is all black, and resistor 50A has a value of about 10,000 ohms so that with substantially zero cathode-ray current the voltage across sensing resistor 50A is 10 volts or so positive. With an all-white, bright picture, and in the absence of the circuit of the invention, the cathode-ray tube is capable of drawing from the high-voltage supply all of this current of 1 to 1 ¼ milliamperes, with the result that the shunt regulator would go completely out of regulation and the final anode voltage would drop to the point where serious defocusing occurs. However, when such conditions tend to occur during operation, the drop in regulator current causes the voltage across resistor 50A to decrease. Accordingly, transistor 140, which normally is conducting heavily and in saturation, in then driven toward its cutoff to an extent depending upon the extent of reduction in regulator current. In the typical embodiment exemplified, a drop in the voltage across sensing resistor 50A below about 0.7 volts is sufficient to cut off transistor 140 and to produce complete and maximum compensation for excessive image brightness. At that point where this drop in voltage across sensing resistor 50A occurs, the regulator current has decreased but has not yet fallen to the point where serious lack of regulation occurs, so that excessive brightness increase is arrested before the final anode voltage has fallen to a harmful degree.

Capacitor 52A in parallel with sensing resistor 50A may have a value of about 1 microfarad, and is utilized primarily in this example to reduce adverse effects should an accidental arc occur in the shunt regulator. Capacitor 146 preferably has a value such that its charging time constant is large compared with the time of a single horizontal scan, and may be made long with respect to the time of a complete television frame.

While the shunt regulator may be the corona discharge device mentioned above, a solid state regulator may also be utilized, or a shunt-type vacuum tube regulator could be employed with appropriate selection of the optimum location and value of the current-sensing resistor.

Figure 3:
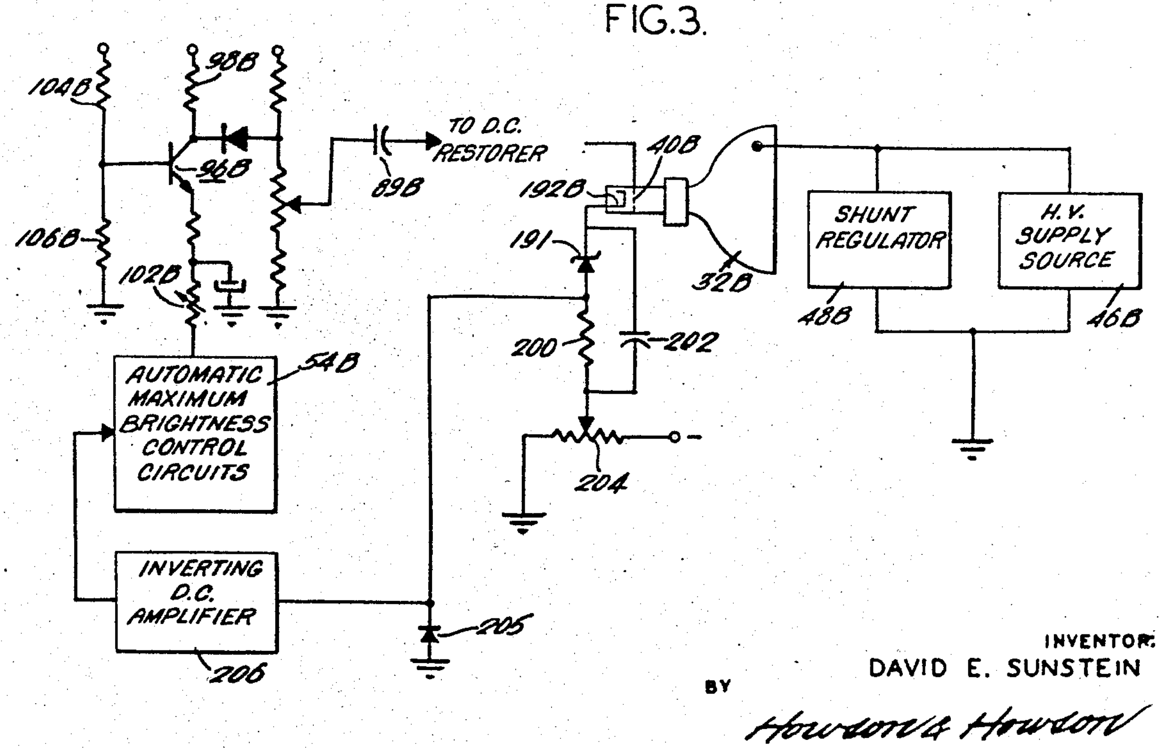
FIG. 3 is a diagram, partly in block form and partly in electrical schematic form, illustrating another embodiment of the invention.

FIG. 3 illustrates a modification of the arrangement depicted in FIG. 2, in which corresponding parts are indicated by the suffix B, and in which the average cathode current for the cathode-ray tube is sensed to derive the control voltage for operating the automatic maximum brightness circuit. In this case the cathode current supply lead is connected in series with voltage-dropping zener diode 191 and with the parallel combination of current-sensing resistor 200 and shunt capacitor 202 having an RC time constant selected to average the cathode-ray current, and hence the cathode-ray beam current, over a suitable interval such as several frames, for example. Diode 205 keeps the cathode of the cathode-ray tube from going below a voltage equal to the drop in the zener diode. The current fed to the sensing resistor 200 is adjusted in DC level by means of the adjustable divider circuit 204 which is set so that the cathode will start to go positive with respect to ground at slightly less than that value of average beam current corresponding to the maximum value which the high voltage supply can deliver while in regulation. A suitable inverting DC amplifier 206 feeds the dropped cathode voltage of the CRT to the control input of the automatic maximum brightness control circuit 54B, so that when the average cathode-ray beam current exceeds a predetermined level for which harmful defocusing might occur, the voltage supplied to the automatic maximum brightness control circuit 54B decreases (changes in a negative direction) to operate the circuit 54B as described previously in connection with FIG. 2.

Figures 4, 5:
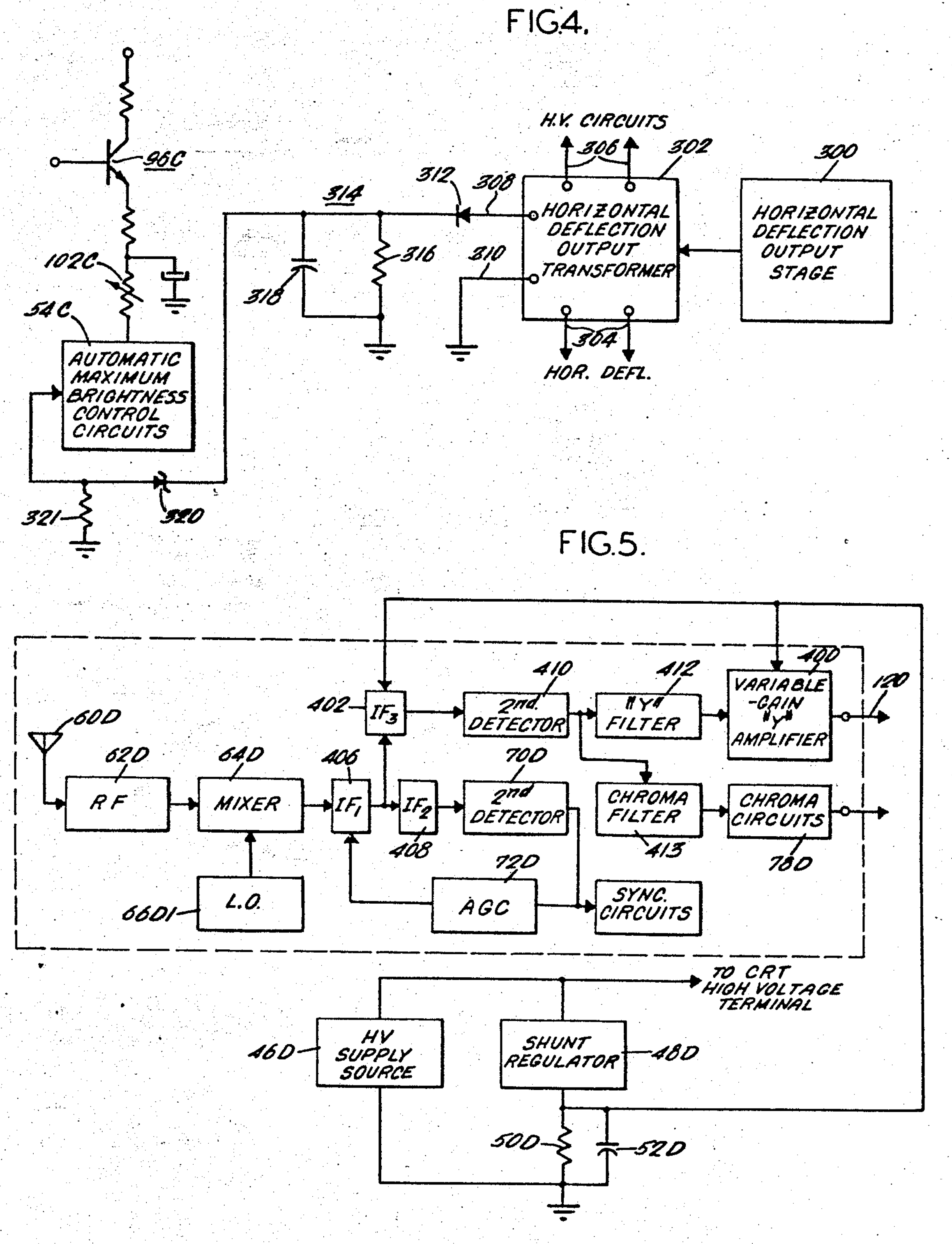
FIG. 4 is a diagram, partly in block form and partly in electrical schematic form, illustrating a further embodiment of the invention.
FIG. 5 is a block diagram, illustrating another embodiment of the invention.

In the embodiment shown in FIG. 4, in which parts corresponding to those of FIG. 2 are shown with the suffix C, the control voltage used to operate the automatic maximum brightness control 54C is derived from the rectified output of a winding on the usual horizontal deflection output transformer. Thus deflection output stage 300 is connected in the usual way to drive the conventional horizontal deflection output transformer 302, which has the usual secondary winding output leads 304 for supplying the horizontal deflection signals and the usual high-voltage output leads 306. In addition, the transformer is provided with a winding, conveniently of very few turns, so as to generate a relatively low voltage at output leads 308, 310. Lead 310 may be grounded, and lead 308 connected through the anode and cathode of a rectifier 312 to the time-constant circuit 314, made up of the parallel combination of resistor 316 and capacitor 318, the voltage developed across the latter circuit being supplied to a series zener voltage reference diode 32C, with lead resistor 321. The voltage across load resistor 321 is fed to the control input of the automatic maximum brightness control circuit 54C. The time constant of the circuit 314 is preferably made such as to produce averaging over the desired interval, which may be several frames in length.

This arrangement operates upon the principle that when the loading on the high voltage supply due to excessive cathode-ray tube beam current exceeds a certain level, this will be reflected back into the horizontal deflection transformer so as to reduce the voltage produced at its secondary output leads, including leads 308 and 310, which voltage reduction then acts through the automatic maximum brightness control circuit 54C to oppose further increases in picture brightness which might produce harmful defocusing of the beam.

As illustrated in FIG. 5, the point in the signal channel at which the control signal for controlling maximum brightness is applied can also differ from that illustrated in FIG. 2. In this figure parts corresponding to those in the preceding figures are designated by corresponding numerals followed by the suffix D. For example, FIG. 5 illustrates an arrangement in which the voltage produced across the resistor 50D is fed back to decrease the gain of the Y signal channel when the average brightness of the reproduced image, and the average cathode-ray beam current, tend to exceed the value at which harmful defocusing occur. The system differs from that shown in FIG. 2 in that the control signal is fed back to control the gain in a Y amplifier 400, and/or also to vary the gain of an intermediate frequency amplifier stage 402 through which the Y signal passes. In order to avoid also varying the gain provided for the synchronizing signals, a separate variable gain IF stage 402 for the Y channel is employed and supplied with received signal from between two successive IF stages 406 and 408 which feed the sync and AGC channels; also IF stage 402 is provided with a separate second detector 410, the output of which is passed through the Y filter 412 and the variable gain Y amplifier 400 to the Y signal output lead 12D and through chroma filter 413 to chroma circuits 78D. The reduction in positive voltage across sensing resistor 50D occurring when the shunt regulator threatens to go out of regulation causes the desired reduction in the gain of IF amplifier stage 402 and/or of variable gain amplifier 400.

It will be understood that the latter feedback may be applied solely to the IF amplifier stage 402 or solely to the variable gain amplifier 400, and is applied to both in this example merely by way of convenience in illustration; the remainder of the system may be generally as illustrated in FIG. 2, except that the circuit 54A need not be employed. The resultant automatic reduction in gain causes the minimum brightness rectifier 86 of FIG. 2 to clip the signal at a level more toward the white extreme thereof, and thus to reduce the maximum average brightness of the reproduced image as desired.

Furthermore, the manual brightness control need not be directly associated with the automatic brightness control circuit as shown in FIG. 2, but, for example, the manual brightness control may be placed in the cathode lead of the last video Y amplifier 38A, or in the cathode of the cathode-ray tube, or in the common cathode lead of a multiple-gun color television tube. In this event, the manual brightness control will operate more like that in a conventional black and white or color television set, and will not influence the level at which the clipping of the signal occurs in rectifier 86. If the manual brightness control is so placed further along in the Y channel than the rectifier 86, the manual contrast control is preferably placed ahead of the rectifier 86 so that the operator will have available at his disposal some method of controlling the level at which clipping occurs, thereby providing the ability to adjust the receiver to reproduce a satisfactory gray scale under a wide variety of conditions.

It is also possible to sense the imminence of harmful defocusing by detecting the average value of ambiguous index current from the photosensitive device 30A and using this, after appropriate amplification and adjustment of DC level, to control the automatic maximum brightness control circuit. When the cathode-ray beam intensity exceeds a predetermined level for which defocusing becomes imminent, the index signal will have reached a strength indicative of this fact and will act automatically to prevent further increase in cathode-ray beam intensity.

It is noted that the embodiments described in detail hereinbefore operate to sense the effects of high intensity of the cathode-ray beam, rather than directly sensing the value of the signals producing such cathode-ray beam intensity. This is because, due to the non-linear current-versus-grid drive characteristic of the cathode-ray tube corresponding to its gamma of greater than one, television signals having large AC components will produce higher average beam currents than television signals of the same average value but having little or no AC components. The arrangements described above are therefore more accurate in detecting and controlling the parameter actually of interest, namely the average value of the cathode-ray beam intensity itself.

The invention may be applied to image-display devices other than cathode-ray tubes. For example, in an image-display device consisting of an array of small light-emitting diodes each controlled by a current supplied through corresponding wires, the average value of the current may be sensed and the resultant control signal used to limit the average current when it tends to increase above a predetermined value.

Accordingly, while the invention has been described in the interest of complete definiteness with particular reference to specific embodiments thereof, it may be embodied in a wide variety of forms differing from those specifically shown and described above without departing from the spirit and scope of the invention as defined by the appended claims.

What is claimed is:

1. The method of producing a brightness control signal for supply to a television image display device the image of which is adversely influenced in a first respect by excessive average brightness as averaged over a substantial part of the displayed image, and in a second respect by too little brightness occurring during much lesser portions of said image, which comprises:

forming an original brightness control signal;

modifying said original brightness control signal before supplying it to said image display device in such a way as to reduce the average brightness of the displayed image whenever the said original brightness control signal would, without such modification, have otherwise tended to adversely influence said image in said first respect, and limiting the minimum brightness of said image to prevent it from falling below a value for which said image is adversely influenced in said second respect.

2. The method of claim 1, in which said modifying comprises automatically adjusting the DC component of said original brightness control signal.

3. The method of claim 1, in which said modifying comprises clipping said original brightness control signal at a controlledly variable level thereof.

4. The method of claim 3, in which said modifying comprises providing DC restoration of said clipped brightness control signal prior to its application to said image display device.

5. Apparatus for preventing quality-degrading decreases in the anode voltage of a cathode-ray tube due to excessive average cathode-ray beam current, comprising:

means for sensing imminence of said quality-degrading decreases in anode voltage and for producing an electrical control signal indicative thereof;

means for scanning said beam over an area of said tube; and means for maintaining above a lower threshold the minimum average value of current of said beam as averaged over at least a portion of said area, despite the action of said control signal to reduce said average current.

6. Apparatus in accordance with claim 5, comprising threshold means operative to prevent said control signal from reducing the average current of said beam except when tendencies for said quality-degrading decreases in final anode voltage are sensed.

7. Apparatus for preventing quality-degrading decreases in the anode voltage of a color television image-display cathode-ray tube due to excessive average cathode-ray beam current, comprising:

means for sensing imminence of said quality-degrading decreases in anode voltage and for producing an electrical control signal indicative thereof; and means tending to maintain said beam current at or above a predetermined minimum value as averaged over at least a portion of the scanning of said viewing area by said beam.

8. Apparatus in accordance with claim 7, comprising threshold means for preventing said reduction in average current of said beam except when said quality-degrading decreases in final anode voltage are sensed.

9. Apparatus in accordance with claim 7, in which said means for producing a control signal comprises means for sensing the cathode current of said tube.

10. In a color television receiver system comprising an indexing cathode-ray image-presentation tube having indexing elements scanned by the cathode-ray beam of the tube to produce index signals, having beam intensity control means for controlling the intensity of said beam, and having a high-voltage anode; brightness-channel means for receiving color television signals to produce a brightness signal representative of changes in brightness of the image to be reproduced for application to said beam-intensity controlling means; means for producing chroma signals representative of the coloration of the image to be reproduced; means for combining said chroma signals and said index signals to produce a color-controlling signal for application to said beam-intensity controlling means to control the coloration of the reproduced image; and high-voltage supply means for supplying high voltage to said anode of said tube, said supply means producing a voltage which varies with the average current of said cathode-ray beam, the improvement comprising:

means for producing a control signal indicative of a change of said voltage, and means responsive to said control signal for controlling said average value of said beam current;

said brightness-channel means comprising signal-clipping means to clip said brightness signal at different levels depending upon the value of said control signal, and DC restorer means responsive to said clipped brightness signal to clamp it at a substantially fixed level with respect to its clipping level and to supply it to said beam-intensity controlling means, said control signal being of the sense to clip said brightness signal farther toward the peak-brightness extreme thereof when said high-voltage tends to decrease.

11. The system of claim 10, in which said DC restorer means clamps said brightness signal at a value such as to maintain a predetermined minimum intensity of said beam as it scans the viewing area of said tube.

12. In a system according to claim 10, means for effectively adding said chroma signals to said brightness signal.

13. Apparatus in accordance with claim 10, comprising means for periodically blanking said beam when it scans beyond the area of said tube on which the viewed image is formed.

14. Apparatus in accordance with claim 10, comprising means for periodically interrupting application of said chroma and brightness signals to said beam-intensity controlling means and for applying other signals to said beam-intensity controlling means during said interrupting.

15. Apparatus for preventing substantial defocusing of a scanning cathode-ray beam in the color-image reproducing cathode-ray tube of a color television receiver, due to increases of the average cathode-ray beam current above a predetermined level, comprising:

means responsive to changes in the average value of said beam current for producing a control signal;

means responsive to said control signal for modifying the signal applied to the beam-intensity controlling electrode of said tube in such a direction as to tend to prevent said average beam current from exceeding said predetermined level; and means to maintain at no less than a minimum value the current in said beam during at least a portion of its scanning.

16. Apparatus in accordance with claim 15, comprising a high-voltage supply for the final anode of said tube including a horizontal deflection transformer, and in which said means for producing a control signal comprises means connected to said transformer for sensing decreases in the amplitude of the horizontal flyback pulse produced in said transformer.

17. Apparatus in accordance with claim 15, in which said means responsive to said control signal comprises variable-gain means in the signal channel through which a brightness-representing component of the received television signal is supplied to the intensity-controlling electrode of said tube and supplied with said control signal.

18. Apparatus for preventing substantial defocusing of the cathode-ray beam in the color-image reproducing cathode-ray tube of a color television receiver, due to increases of the average cathode-ray beam current above a predetermined level, comprising:

means responsive to changes in the average value of said beam current for producing a control signal;

means responsive to said control signal for modifying the signal applied to the beam-intensity controlling electrode of said tube in such a direction as to tend to prevent said average beam current from exceeding said predetermined level; and a high-voltage supply for the final anode of said tube including a high-voltage regulating device;

said means for producing a control signal comprising means for sensing when said regulator is near one end of its regulation range.

19. Apparatus in accordance with claim 18, in which said high-voltage supply comprises voltage regulating means and said sensing means comprises means for sensing the current through said voltage regulating means.

20. Apparatus in accordance with claim 19, in which said voltage regulating means is a shunt regulator.

21. Apparatus for preventing substantial defocusing of the cathode-ray beam in the color-image reproducing cathode-ray tube of a color television receiver, due to increases of the average cathode-ray beam current above a predetermined level, comprising:

means responsive to changes in the average value of said beam current for producing a control signal; and means responsive to said control signal for modifying the signal applied to the beam-intensity controlling electrode of said tube in such a direction as to tend to prevent said average beam current from exceeding said predetermined level;

said means for producing a control signal comprising means for sensing the cathode current of said tube.

22. Apparatus for preventing substantial defocusing of the cathode-ray beam in the color-image reproducing cathode-ray tube of a color television receiver, due to increases of the average cathode-ray beam current above a predetermined level, comprising:

means responsive to changes in the average value of said beam current for producing a control signal;

means responsive to said control signal for modifying the signal applied to beam-intensity controlling means of said tube in such a direction as to tend to prevent said average beam current from exceeding said predetermined level;

signal-clipping means supplied with a brightness-representing component of the received television signal to produce clipped brightness-representing signals; and DC restorer means supplied with said clipped brightness-representing signals for clamping said clipped brightness-representing signals at a substantially fixed level with respect to their clipped level and for supplying said clamped signals to said beam-intensity-controlling means of said tube;

said means responsive to said control signal comprising means for automatically varying the clipping level in said clipping means.

23. In a cathode-ray tube system comprising a cathode-ray tube image-display device, circuit means for supplying a television signal to beam-intensity controlling means of said image-display device, and a high-voltage supply for said image-display device;

DC restorer means for clamping the black-going extreme excursions of said television signal at a predetermined value; and control circuit means for clipping said black-going extreme excursions of said signal at controlledly different levels prior to application of said signal to said DC restorer, thereby to vary the average brightness of the image displayed by said device without changing substantially the minimum brightness thereof established by said DC restorer means;

means for sensing a quantity related to said average brightness to produce a control signal; and means for controlling said control circuit means in response to said control signal to vary said clipping level only when said average brightness exceeds a predetermined maximum value.

24. In apparatus for preventing quality-degrading decreases in the anode voltage of a cathode-ray tube due to excessive cathode-ray beam current, comprising a source of high-voltage for said tube and voltage regulator means connected to said source:

means for sensing when said regulator is near the end of its regulation range and for producing a control signal indicative thereof; and means responsive to said control signal for reducing said beam current.

25. Apparatus according to claim 24, in which said regulator is connected in shunt with said source, and said sensing means comprises means for sensing when the current through said regulator decreases to a predetermined value.

* * * * *